United States Patent [19]

Ohkubo

[11] Patent Number: 4,671,062
[45] Date of Patent: Jun. 9, 1987

[54] TORQUE CONVERTER HAVING VALVE MEANS FOR DETECTING SPEED RATIO OF TORQUE CONVERTER

[75] Inventor: Masahiro Ohkubo, Kadoma, Japan

[73] Assignee: Kabushiki Kaisha Daikin Seisakusho, Osaka, Japan

[21] Appl. No.: 668,016

[22] Filed: Nov. 5, 1984

[30] Foreign Application Priority Data

Nov. 17, 1983 [JP] Japan ................. 58-217419

[51] Int. Cl.⁴ ............................. F16D 33/00
[52] U.S. Cl. .................. 60/362; 74/655; 74/677; 74/688; 74/718; 74/720; 192/3.31; 192/3.3
[58] Field of Search ............. 60/361, 362; 192/3.31, 192/3.3, 3.29, 56 F; 74/688, 718, 720, 677, 655

[56] References Cited

U.S. PATENT DOCUMENTS

| | | | |
|---|---|---|---|
| 2,147,528 | 2/1939 | Fottinger | 60/362 X |
| 2,685,169 | 8/1954 | Saives | 60/362 |
| 2,982,152 | 5/1961 | DeLorean | 74/677 X |
| 3,557,635 | 1/1971 | Tuck | 192/56 F |
| 3,566,998 | 3/1971 | Honda et al. | 192/3.3 |
| 4,108,290 | 8/1978 | Fisher | 60/361 X |
| 4,281,564 | 8/1981 | Hill | 74/677 X |

Primary Examiner—Edward K. Look
Attorney, Agent, or Firm—Burns, Doane, Swecker & Mathis

[57] ABSTRACT

A speed ratio detecting valve means of torque converter comprising a hub of a stator vane spline fitted onto a fixed shaft and being freely rotatable through a prescribed play angle, the hub being permitted to rotate relative to the fixed shaft by said play angle at a prescribed speed ratio utilizing a phenomenon that the direction of force of a working fluid in the torque converter exerted on the stator vane is reversed when an input-output rotation speed ratio reaches said prescribed value, and causing a fluid passage opening through a fixed shaft inside to an outer periphery of the fixed shaft to joint with or shut off from its jointing part.

1 Claim, 9 Drawing Figures

FIG. 3a  FIG. 4

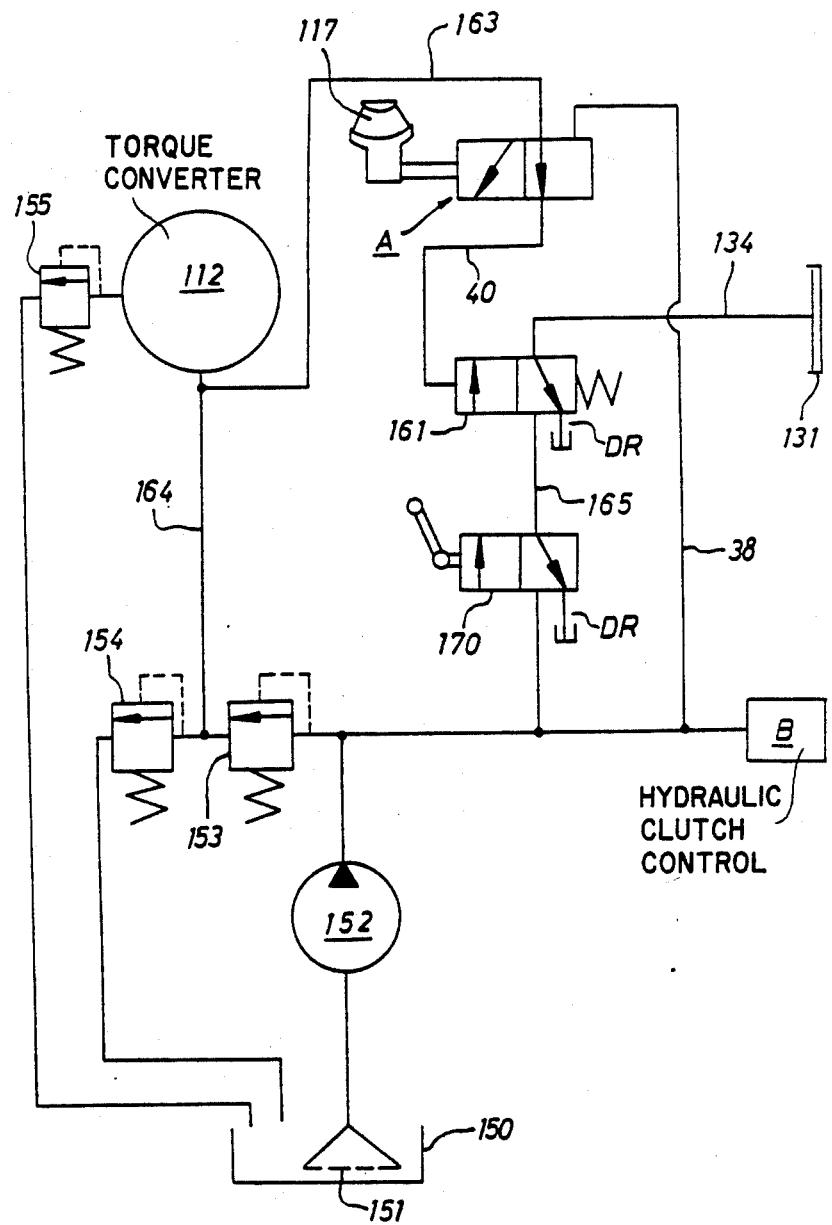

4,671,062

TORQUE CONVERTER HAVING VALVE MEANS FOR DETECTING SPEED RATIO OF TORQUE CONVERTER

FIELD OF THE INVENTION

This invention relates to a torque converter and especially to a valve means for detecting a speed ratio which is able to automatically detect whether an input-output rotation speed ratio of a torque converter is larger or smaller than a prescribed value.

DESCRIPTION OF THE PRIOR ART

A torque converter includes a problem of a remarkable decrease in torque capacity when an input-output rotation speed ratio becomes large. To cope with this problem, a torque converter may sometimes be used in combination with a fluid coupling or a direct-coupled clutch in order to transmit a torque by means of the torque converter when the speed ratio is small and in order to transmit the torque by means of the fluid coupling or the direct-coupled clutch when the speed ratio is large. In such a case, it becomes necessary to detect the input-output rotation speed ratio of the torque converter. However, equipping sensors (electrical sensor etc.) capable of continuously detecting the rotation speeds of the input and output shafts of the torque converter would lead to excess quality. Namely, it is sufficient to only detect whether the speed ratio is larger or smaller than the prescribed value in the above case, so sensors such as the electric sensor etc. are uneconomical.

SUMMARY OF THE INVENTION

Object of the Invention

An object of this invention is to simplify a torque converter by modifying the construction of the torque converter itself to incorporate a speed ratio detecting device, and at the same time to enable easy detection of an input-output speed ratio of the converter being larger or smaller than a prescribed value.

COMPOSITION OF THE INVENTION

A valve means for detecting the speed ratio of a torque converter, according to this invention, comprises a hub of a stator vane spline fitted onto a fixed shaft and being freely rotatable through a prescribed play angle, thus permitting the hub to rotate relatively to the fixed shaft by said play angle at a prescribed speed ratio utilizing a phenomenon that a direction of a force of working fluid in the torque converter exerted on the stator vane is reversed when an input-output rotation speed ratio reaches said prescribed value, and causes a fluid passage opening through the fixed shaft inside to an outer periphery of the fixed shaft to joint with or shut off from its jointing part.

BRIEF DESCRIPTION OF THE DRAWINGS

FIGS. 3a, 3b and 4 are partial sectional views taken on lines III—III and IV—IV of FIG. 2, respectively.

FIGS. 7 and 8 are layout diagrams of hydraulic circuits including the embodiment of FIG. 6.

DETAILED DESCRIPTION OF THE INVENTION

Figure 1:
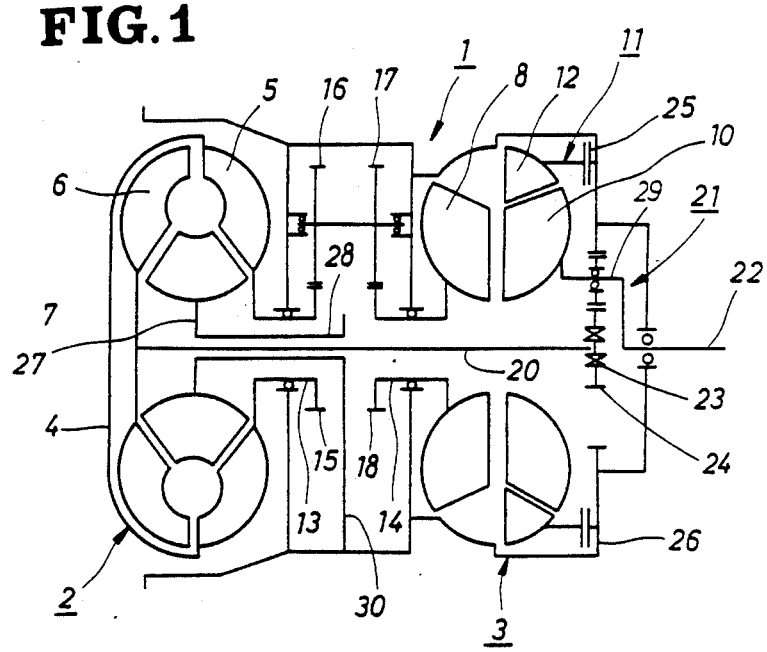
FIG. 1 is a schematic vertical sectional view of a hydraulic power transmission employing the present invention.

FIG. 1 is a schematic vertical sectional view schematically showing the hydraulic power transmission employing the present invention, wherein a hydraulic power transmission 1 provides a torque converter 2 and a fluid coupling 3 (Vulcan fluid coupling). The torque converter 2 has a pump impeller 5 integral with a cover 4, a turbine impeller 6 and a stator vane 7, and the fluid coupling 3 has a pump impeller 8, a turbine impeller 10 and a braking vane 12 of a hydraulic retarder 11 described later. The pump impellers 5, 8 are interconnected through cylindrical extension 13, 14 and gears 15, 16, 17 etc., so that they can rotate integrally. The cover 4 is connected to an engine through a not-shown input shaft.

The turbine impeller 6 of the torque converter 2 is connected to an intermediate shaft 20 (an output shaft of the torque converter 2) so that relative rotation therebetween is presented. Further, the turbine impeller 10 of the fluid coupling 3 is connected through a planetary gear mechanism 21 to an output shaft 22. The output shaft 22 is connected to a not-shown hydraulic speed change mechanism. The intermediate shaft 20 is connected through a one-way clutch 23 to a sum gear 24 of the planetary gear mechanism, and the one-way clutch 23 is so constructed as to permit torque transmission only from the intermediate shaft to the sun gear 24. The above-mentioned hydraulic retarder 11 consists of the braking vane 12 and a brake 25 (for example, a hydraulic brake), and the brake 25 is connected to a housing 26.

Figure 2:
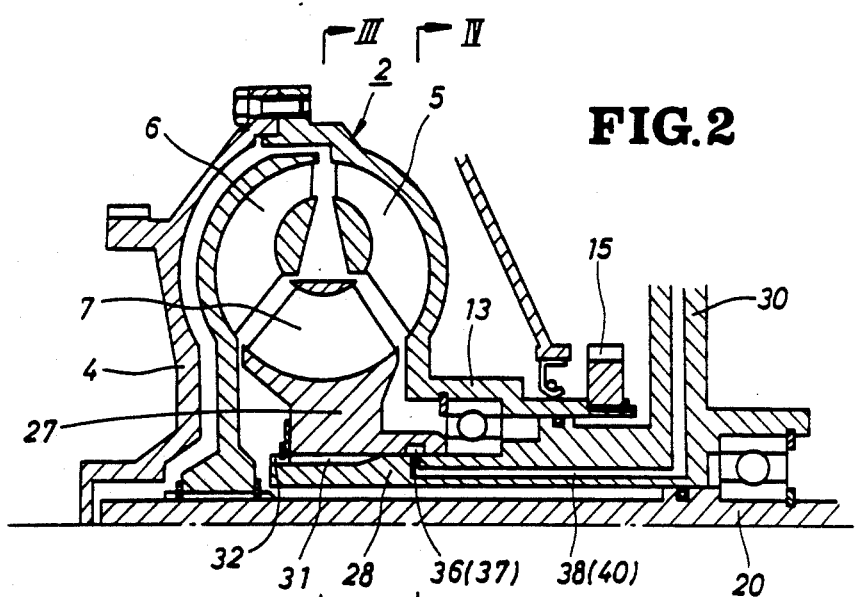
FIG. 2 is an enlarged vertical partial sectional view in the vicinity of the torque converter.
Figure 3B:
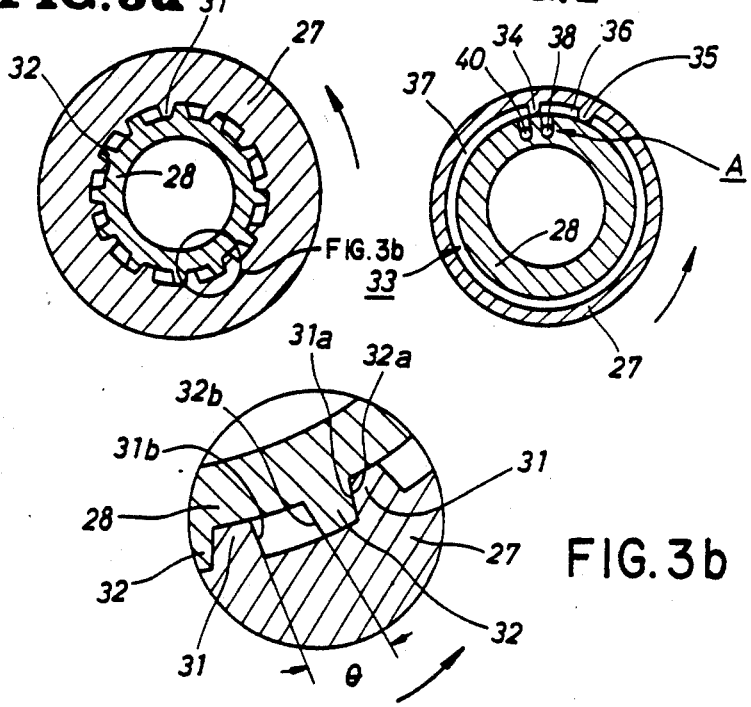

The valve means for detecting the speed ratio according to this invention will now be described. In FIG. 2 which is the enlarged vertical partial sectional view of the vicinity of the torque converter 2, the aforementioned stator vane 7 has a hub 27 formed integrally therewith, and the hub 27 spline fits onto a cylindrical fixed shaft 28. The cylindrical fixed shaft 28 connects through a rectangular flange portion 30 to the housing. As shown in FIG. 3a which is the partial sectional view taken on the line III—III of FIG. 2 and its enlarged partial view FIG. 3b, one side-face 31a of an internal spline 31 of the hub 27 presses on one side-face 32a of an external spline 32 of the fixed shaft 28, and a prescribed play angle $\theta$ is provided between the other side-faces 31b of the splines 31, 32. Therefore, the hub 27 is freely rotatable in relation to the fixed shaft 28 by the angle $\theta$ in the direction of arrow.

As shown in FIG. 4 which is the partial sectional view taken on the line IV—IV of FIG. 2, an annular space 33 is provided between an inner periphery of the hub and an outer periphery of the fixed shaft, and the space 33 is divided into a high-pressure port 36 and a low-pressure port 37 by means of a pair of partitions 34, 35 of the hub 27. A pair of parallel fluid passages 38, 40 is provided in the fixed shaft 28, with the passage 38 opening to the high-pressure port 36 and the passage 40 opening to the low-pressure port 37 through radial holes respectively. In the state of this figure, the passages 38, 40 are isolated from each other by the partition 34. In the present invention, a speed ratio detecting valve means A is composed, for example, of the passages 38, 40 and the ports 36, 37.

Here, the function of the hydraulic power transmission 1 will be described first of all. In FIG. 1, a torque of the engine is transmitted through the aforementioned input shaft and the cover 4 to the pump impeller 5 of the torque converter 2, and a torque of the pump impeller 5 is transmitted to the pump impeller 8 of the fluid coupling 3 as mentioned above. During operation, the torque converter 2 is always supplied with working oil (working fluid) but the fluid coupling 3 is supplied with the working oil only when an input-output rotation speed ratio (output rotation speed/input rotation speed) exceeds a prescribed value. Thereby, the torque of the engine is transmitted from the turbine impeller 6 of the torque converter 2 through the intermediate shaft 20, the one-way clutch 23 and the planetary gear mechanism 21 to the output shaft 22 when the speed ratio lies in a low speed ratio range below said prescribed value, while the turbine impeller 10 of the fluid coupling 3 does not transmit the torque. On the other hand, when the speed ratio lies in a high speed ratio range above the aforementioned prescribed value, both the torque converter 2 and the fluid coupling 3 work. However, since a speed of the sum gear 24 is increased by a rate of a gear ratio as compared with a planet carrier 29 concentric when the turbine impeller 10 of the fluid coupling 3 in the high speed range, the torque of the engine is transmitted from the turbine impeller 10 of the fluid coupling 3 through the planetary gear mechanism 21 to the output shaft 22, while the torque from the turbine impeller 6 of the torque converter 2 is shut off by the one-way clutch 23.

The detection of speed ratio of the torque converter 2, which is an essential point of this invention, will now be described. It is well known in torque converters that a direction of force of working oil applied on the stator vane 7 of FIG. 2 reverses at a border between the low speed ratio range and the high speed ratio range. Conventionally, there has been a torque converter in which the hub 27 of the stator vane 7 has been fitted onto the cylindrical fixed shaft 28 through a one-way clutch and the stator vane 7 has been permitted to rotate in relation to the fixed shaft 28 only in the high speed ratio range utilizing the above-mentioned phenomenon. Also, in the present invention, the speed ratio is detected by utilizing the above-mentioned phenomenon.

Namely, the side-face 31a of the internal spline 31 presses on the side-face 32a of the external spline 32 in the low speed ratio range as shown in FIG. 3a, and both the passages 38, 40 of FIG. 4 are isolated from each other in this instance as mentioned above. When the speed ratio reaches said prescribed value, the direction of force of the working oil applied on the stator vane 7 reverses to cause rotation of the hub 27 by the angle θ in the direction of arrows of FIGS. 3a, 3b and 4 to have the side-face 31b of the internal spline 31 press on the side-face 32b of the external spline 32. At the same time, both passages 38, 40 open to the high-pressure port 36 and the passages 38, 40 connect with each other through the high-pressure port 36. Namely, in the speed ratio detecting valve means A, the passages 38, 40 are isolated from each other in the low speed ratio range, and the passages 38, 40 are interconnected in the high speed ratio range.

Figure 5:
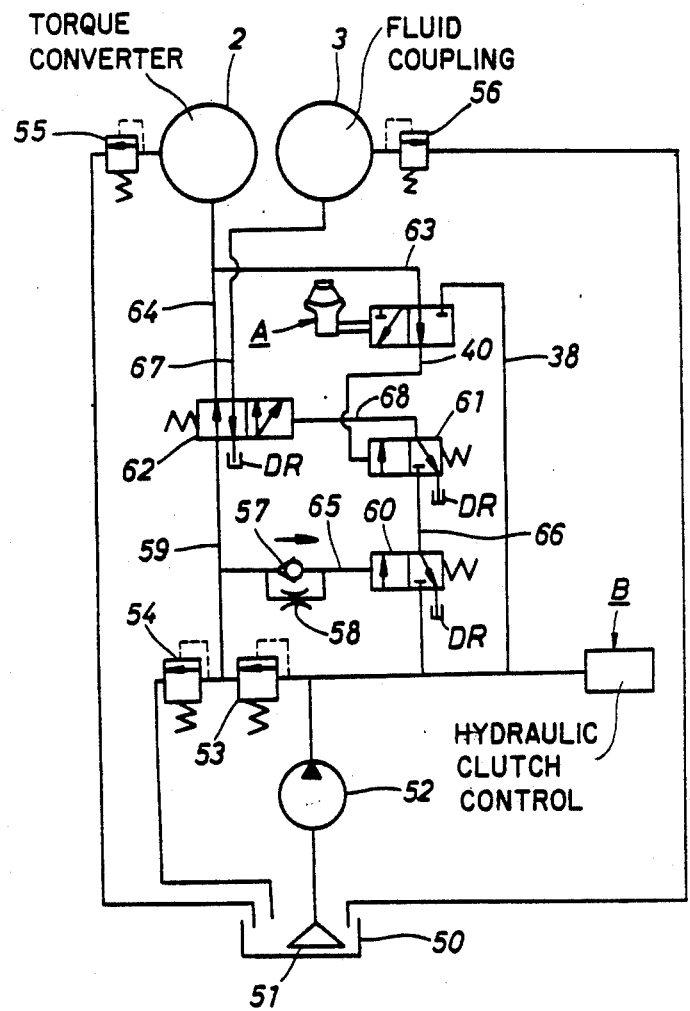
FIG. 5 is a layout diagram of a hydraulic circuit including the valve means for detecting a speed ratio.

The speed ratio detecting valve means A is assembled, for example, in a hydraulic circuit as shown in FIG. 5, and this hydraulic circuit enables controls such as the supply and stoppage of working oil to the fluid coupling 3. In FIG. 5, there can be an oil reservoir 50, a strainer 51, a charging pump 52 driven by the engine, relief valves 53, 54, 55, 56, a check valve 57 permitting oil flow only in the direction of the arrow, a throttle valve 58, a hydraulic operation & spring offset type two-way valves, a hydraulic operation & spring offset type four-way valve 62, and a drain DR. The passage 38 of the speed ratio detecting valve means A connects to the charging pump, and the passage 40 connects to an operation part of the two-way valve 61. Further, said low-pressure port of the valve means A connects through a passage 63 to a working oil inlet passage 64 of the torque converter 2. Incidentally, a control mechanism B is included for controlling a hydraulic clutch in said speed change mechanism.

FIG. 5 shows a state under a super low speed ratio range immediately after starting and, in this state, the working oil is supplied from the charging pump 52 through the relief valve 53, a passage 59, the four-way valve 62 and the inlet passage 64 to the torque converter 2 but the working oil is not supplied to the fluid coupling. When the engine rotation speed increases and the speed ratio of the torque converter 2 increases together therewith, a hydraulic pressure in a passage 65 rises and the two-way valve 60 changes over to the right of the figure. Thereafter, oil is supplied from the charging pump 52 to both a passage 66 and the torque converter 2. When the speed ratio further increases to reach said prescribed value, the valve means A changes over to the right of the figure to cause the passage 38 to connect to the passage 40. Thereby, a hydraulic pressure in the passage 40 increases and the two-way valve 61 changes over to the right of the figure. Oil in the passage 66 is successively supplied through the two-way valve 61 and a passage 68 to an operation part of the four-way valve 62 to cause the four-way valve 62 to change over to the left of the figure. Thereafter, oil in the passage 59 is supplied through the four-way valve 62 and both inlet passages 64, 67 to both the torque converter 2 and the fluid coupling 3. When the speed ratio of the torque converter 2 lowers to below said prescribed value, each valve changes over in the reverse direction of those mentioned above to stop oil from being supplied to the fluid coupling 3.

EFFECT OF THE INVENTION

According to the present invention, it becomes possible to easily detect whether the input-output rotation speed ratio of the torque converter is larger or smaller than the prescribed value. The speed ratio detecting valve means is assembled in the torque converter itself, so its construction becomes simple and its manufacturing cost can be saved.

ANOTHER EMBODIMENT (a) In the preferred embodiment of the invention, the hydraulic circuit as shown in FIG. 5 is formed by using the speed ratio detecting valve means A. However, composition of the hydraulic circuit can be modified variously. It is possible to apply the speed ratio detecting valve means A according to this invention to other purposes than described above.

Figure 6:
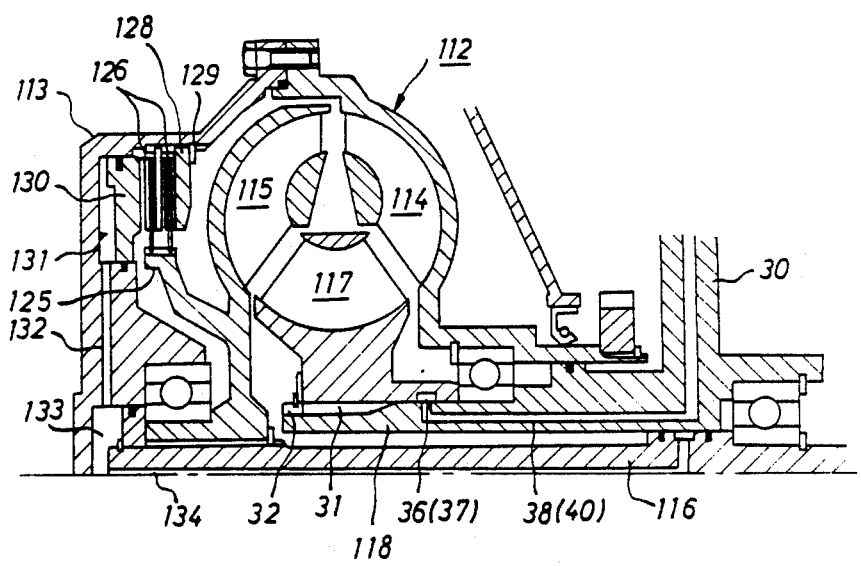
FIG. 6 is a schematic vertical sectional view of another embodiment.

(b) FIG. 6 is a vertical sectional view of such another embodiment. In FIG. 6 (a direction of arrow F shows a front side), a torque converter 112 is so constructed that its torque converter housing 113 is connected to a not-shown input-side flywheel. The torque converter housing 113 is capable of rotating integrally with a pump impeller 114 fixed concentrically thereto, a turbine impeller 115 is disposed in an inside thereof, and the turbine impeller 115 is spline fitted onto and connected to a central output shaft 116. A stator vane 117 is concentrically disposed between the pump impeller 114 and the turbine impeller 115, and an inner peripheral part of the stator vane 117 spline fits onto a central fixed shaft 118, thus the speed ratio detecting valve means A (FIG. 4) has the same construction as those of FIG. 2 to FIG. 4.

In the torque converter housing 113, a cylindrical boss 125 is integrally formed in front of the turbine impeller 115 and an inner peripheral part of a cluth plate 126 fits into an outer peripheral part of the boss 125 and is freely slidable in the axial direction. An annular pressure plate 128 is disposed on a rear side of the clutch plate 126 through a slight clearance left therebetween, and the pressure plate 128 spline fits onto an inner peripheral surface of the torque converter housing 113 at its outer peripheral side and at the same time is limited froms sliding backward by means of a snap ring 129. A pistong 130 serving also as a pressure plate against the clutch plate 126 is disposed at a front side of the clutch plate 126, and the piston 130 fits into an annular recess formed in the torque converter housing 113 and is freely slidable in the axial direction and keeps liquid tightness. Further, a hydraulic chamber 131 is formed between the torque converter housing 113 and the piston 130. The hydraulic chamber 131 connects to a passage 134 formed in a central part of an output shaft 116 through a passage 132 formed in the torque converter housing 113 and a recession 133 into which the output shaft 116 fits.

Figure 7:
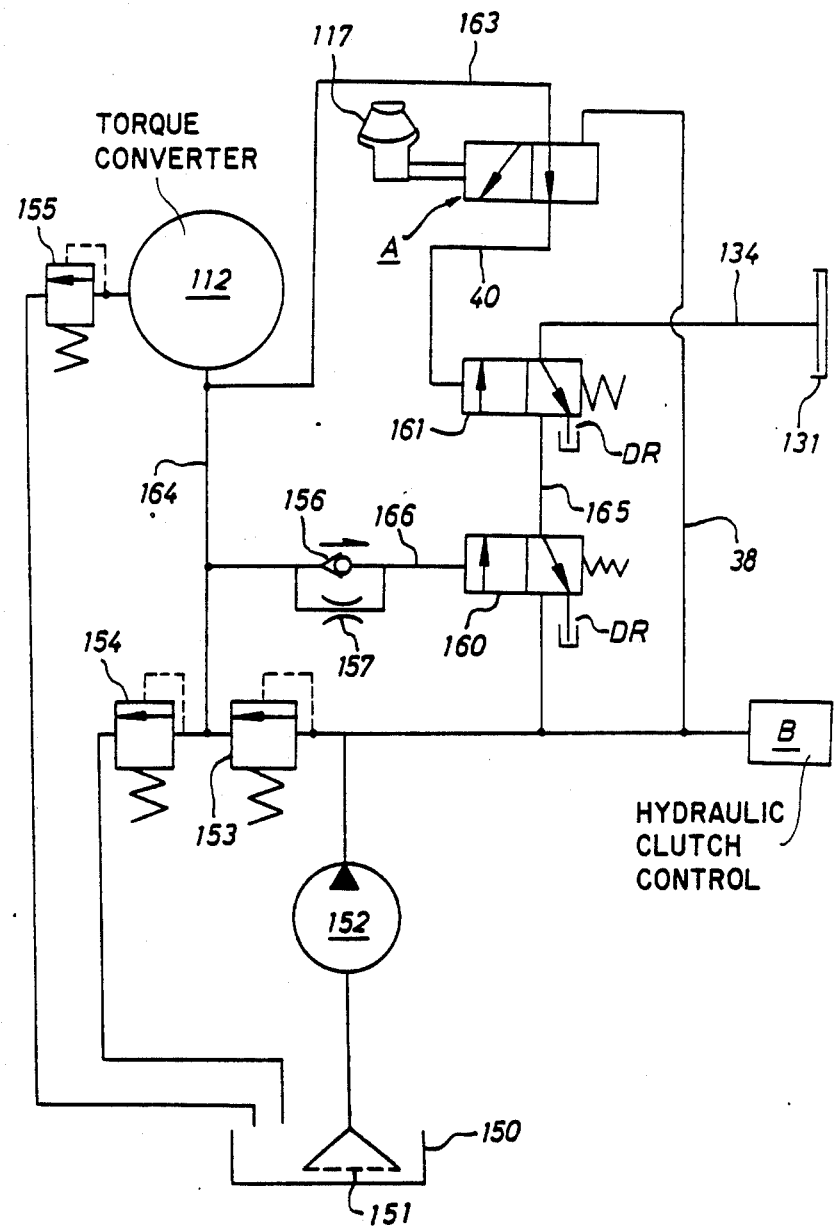

Said torque converter 112 is assembled, for example, in a hydraulic circuit as shown in FIG. 7, and this hydraulic circuit is so constructed as to control hydraulic pressure to the hydraulic chamber 131. In FIG. 7, there is shown an oil reservoir 150, a strainer 151, a charging pump 152 driven by an engine, relief valves 153, 154, 155, hydraulic operation & spring offset type two-way valves 160, 161, a drain DR, a check valve 165 permitting oil to flow only in the direction of the arrow, and a throttle valve 157. The passage 38 of the speed ratio detecting valve means A connects to the charging pump 152, and the passage 40 connects to an operation part of the two-way valve 161. Further, said low-pressure port 37 (FIG. 6) of the valve means A connects through a passage 163 to a working oil inlet passage 164 of the torque converter 112.

The two-way valve 160 is actuated by a passage 166 branching from a passage 164 and passing through the check valve 156 and the throttle valve 157, and which changes over a passage 165 connecting the valve 161 and the valve 160 to either a pump 152 side or a drain DR side. Further, the valve 161 can change over a passage 134 connected to the hydraulic chamber 131 to either a passage 165 side or a drain DR side. Incidentally, a control mechanism B is included for controlling the hydraulic clutch in said speed change mechanism.

The function of the mechanism will now be described. FIG. 7 shows a state during a low speed ratio range immediately after starting and, in this state, the working oil is supplied from the charging pump 152 through the relief valve 153 and the inlet passage 164 to the torque converter 112 but the working oil is not supplied to the hydraulic chamber 131. Then, when engine rotation speed is increased to increase the rotation speed of the charging pump 152, a delivery of the charging pump 152 increases in proportion thereto and oil flow in the passage 164 also increases, so that the pressure in the passage 164 will override to change over the two-way valve 160 to a position where the passage 165 is connected to the pump 152 through means of the passage 166 which branches from the passage 164 and passes through the check valve 156 and the throttle valve 157. Thereafter, the hydraulic pressure is also supplied from the charging pump 152 to the passage 165, but the hydraulic pressure is not supplied to the passage 134 during a small speed ratio due to the valve 161.

When the speed ratio increases to reach said prescribed value, the valve means A changes from the state shown in the figure and makes the passage 38 connect to the passage 40. Thereby, the hydraulic pressure in the passage 40 rises and the two-way valve 161 changes over to a position where the passage 134 is connected to the passage 165. As a result, oil in the passage 165 is supplied through the two-way valve 161 and the passage 134 to the hydraulic chamber 131, the hydraulic chamber 131 is brought to pressurized condition, the clutch plate 126 in FIG. 6 presses on the pressure plate 128, thus the housing 113 connects directly to the turbine impeller 115. When the speed ratio of the torque converter 112 lowers to below said prescribed value, each valve changes in the reverse direction of those mentioned above to stop oil from being supplied to the hyraulic chamber 131.

As another application, the torque converter 112 may be assembled, for example, in a hydraulic circuit as shown in FIG. 8 to enable control of hydraulic pressure to the hydraulic chamber 131. A two-way valve 170 in FIG. 8 is equivalent to the two-way valve 160 in FIG. 7, and in FIG. 7 the change-over is made automatically by the passage 166 while in FIG. 8 the change-over is made manually by the two-way valve 170.

In FIG. 8, even if the two-way valve 170 is manually changed to a lock-up position to cause a hydraulic pressure to be supplied from the charging pump 152 to the passage 165, the valve means A will maintain the state of FIG. 8 when the torque converter is in the low speed ratio range. Consequently, the two-way valve 161, which supplies oil to the hydraulic chamber 131 actuating the direct-coupled clutch, is located at a position where the hydraulic chamber 131 is drained because a pressure in the passage 40 is low.

Then, when the speed ratio increases to cause the valve means A to change over, a high pressure oil is led from the charging pump 152 through the passage 38 to the passage 40 so that the two-way valve 161 is changed over. Thereby, the passage 134 is connected to the passage 165 and a hydraulic pressure is led to the hydraulic chamber 131 to bring the converter to the lock-up condition. Namely, the valve 161 has a function as a safety valve to prevent the lock-up actuation when the speed ratio is small.

On the other hand, when the lock-up actuation is not desired, the valve 170 is changed to a position as shown in the figure. In this case, no hydraulic pressure is supplied to the hydraulic chamber 131 independently of the change-over position of the valve 131, so that the lock-up actuation will never be effected even when the speed ratio increases.

As described above, the speed ratio detecting valve means A may be applied to the automatic control circuit for the direct coupled clutch and as the safety device for the manual control circuit.

What is claimed is:

1. A power transmission means for transmitting drive from an input shaft to an output shaft, said transmission means comprising:
   1. a fixed shaft,
   2. first spline means formed on a poriton of said fixed shaft,
   3. a plurality of passages extending through said fixed shaft, and
   4. openings connecting said passages to an outer periphery of said fixed shaft,
   5. a torque converter at an input side of said transmission means, said torque converter having an input-output rotation speed ratio and comprising,
      A. a first pump impeller rotatable supported around said fixed shaft and connected to said input shaft for moving fluid,
      B. a first turbine impeller rotatable supported around said fixed shaft adjacent said pump impeller, said turbine impeller being in fluid contact with said pump impeller, and
      C. a hub supported on said fixed shaft adjacent said first pump impeller and said first turbine impeller, said hub comprising,
         i. an inner substantially cylindrical hole forming an inner surface through which said fixed shaft extends, and
         ii. second spline means formed on at least a portion of said inner surface, said first and second spline means interconnecting through a play angle to allow limited rotational movement of said hub around said fixed shaft,
   6. an annular space provided between a portion of said inner surface of said hub and said outer periphery of said fixed shaft,
   7. partition means in said annular space formed on said inner surface of said hub, a high pressure port and a low pressure port being formed thereby,
   8. a stator vane mounted on said hub and being in fluid contact with said first pump impeller and said first turbine impeller, the force of said working fluid during operation of the transmission means causing said stator vane and said hub to rotate in the direction of said force through said play angle, said high pressure port and said low pressure port being movable by said hub rotation between a first position where said high pressure port connects with a first of said openings in said fixed shaft and said low pressure port is exposed to a second of said openings in said fixed shaft, and a second position where said high pressure port is connected to both said first and second openings, said force being directed to rotate said hub to said first position when said input-output rotation speed ratio of said torque converter is below a prescribed value, and being directed to rotate said hub to said second position when said input-output rotation speed ratio of said torque converter reaches and exceeds said prescribed value,
   9. a working fluid supply means comprising at least one working fluid supply valve, said supply means controlling the supply of working fluid to said transmission means,
   10. a fluid coupling comprising,
      A. a second pump impeller connected to said first pump impeller of said torque converter,
      B. a second turbine impeller adjacent said second pump impeller, working fluid being supplied to said fluid coupling through said fluid supply valve only when said hub is in said second position and both said first and second openings are connected to said high pressure port, said second turbine impeller being in fluid contact with said second pump impeller when working fluid is supplied to said fluid coupling.

* * * * *